United States Patent [19]

Crandall et al.

[11] 3,961,983

[45] June 8, 1976

[54] APPARATUS AND METHOD FOR WASHING INTERIORS OF TRUCK AND TRAILER BODIES

[75] Inventors: Clyde O. Crandall, Pleasanton; Charles Delbert Douglas, Oceanside, both of Calif.

[73] Assignee: Safeway Stores, Incorporated, Oakland, Calif.

[22] Filed: Dec. 23, 1974

[21] Appl. No.: 535,287

[52] U.S. Cl. .................................. 134/8; 15/21 E; 15/53 A; 15/56; 134/45; 134/168 R
[51] Int. Cl.² .................................................. B60S 1/00
[58] Field of Search ............... 15/21 R, 21 D, 21 E, 15/56, 57, 88, 104.09, 104.1 R, 104.1 C, 104.2; 134/23, 45, 123, 169, 8, 22 R, 22 C, 24, 168

[56] References Cited
UNITED STATES PATENTS

| | | | |
|---|---|---|---|
| 1,932,068 | 10/1933 | Englebright et al. | 15/104.1 R X |
| 3,164,491 | 1/1965 | Brockett et al. | 15/104.09 X |
| 3,400,419 | 9/1968 | Fuller | 15/104.1 R |
| 3,689,318 | 9/1972 | Phillips | 134/123 X |
| 3,824,646 | 7/1974 | Jai | 15/104.2 |

*Primary Examiner*—Edward L. Roberts
*Attorney, Agent, or Firm*—Flehr, Hohbach, Test

[57] ABSTRACT

Apparatus and method is disclosed for washing out the interiors of truck and trailer bodies. A washer head is carried on an elongate boom which is mounted on a pedestal for traversing movement along a horizontal axis. The boom is moved by means of a drive motor which is in engagement with a chain having its opposite ends secured to opposite ends of the boom. The washer head includes a frame which is mounted on an end of the boom for pivotal movement between elevated and lower positions. The frame is constructed in a four-bar linkage arrangement for movement through a lateral angle to accommodate any misalignment as the boom enters the trailer. A cam engages a hoist arm connected with the frame of the washer head, and a motor is controlled to rotate the cam for raising and lowering the washer head. The washer head mounts a brush which is operated as the boom withdraws from the trailer interior. A series of spray nozzles on the washer head are connected through flexible hoses with conduits carried on the boom, and these conduits in turn are connected with flexible hoses which are supported on a floating linkage. Photocells and limit switches are provided for controlling the operating functions in such a manner that the operator need only back the trailer into a position for initiating forward movement of the boom into the trailer as detergent is being sprayed. The control system automatically withdraws the boom from the trailer as brushing and rinse spray action progress, and the operator then drives the trailer forward for completion of the washing cycle.

13 Claims, 10 Drawing Figures

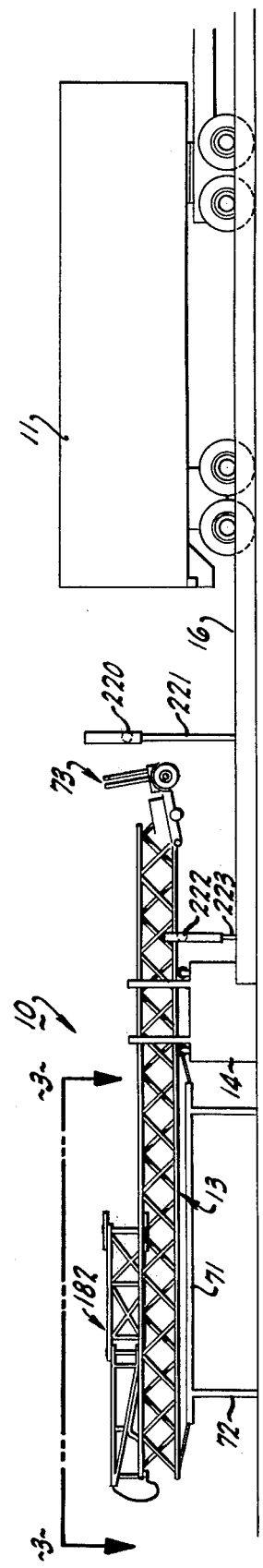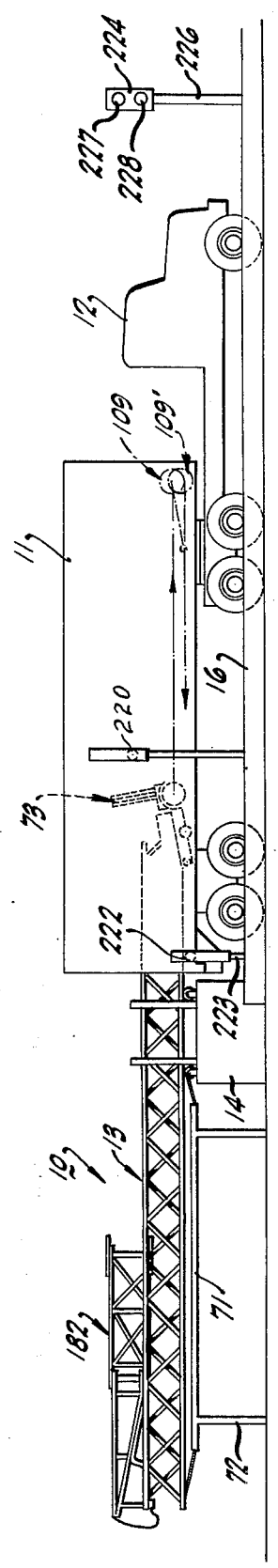

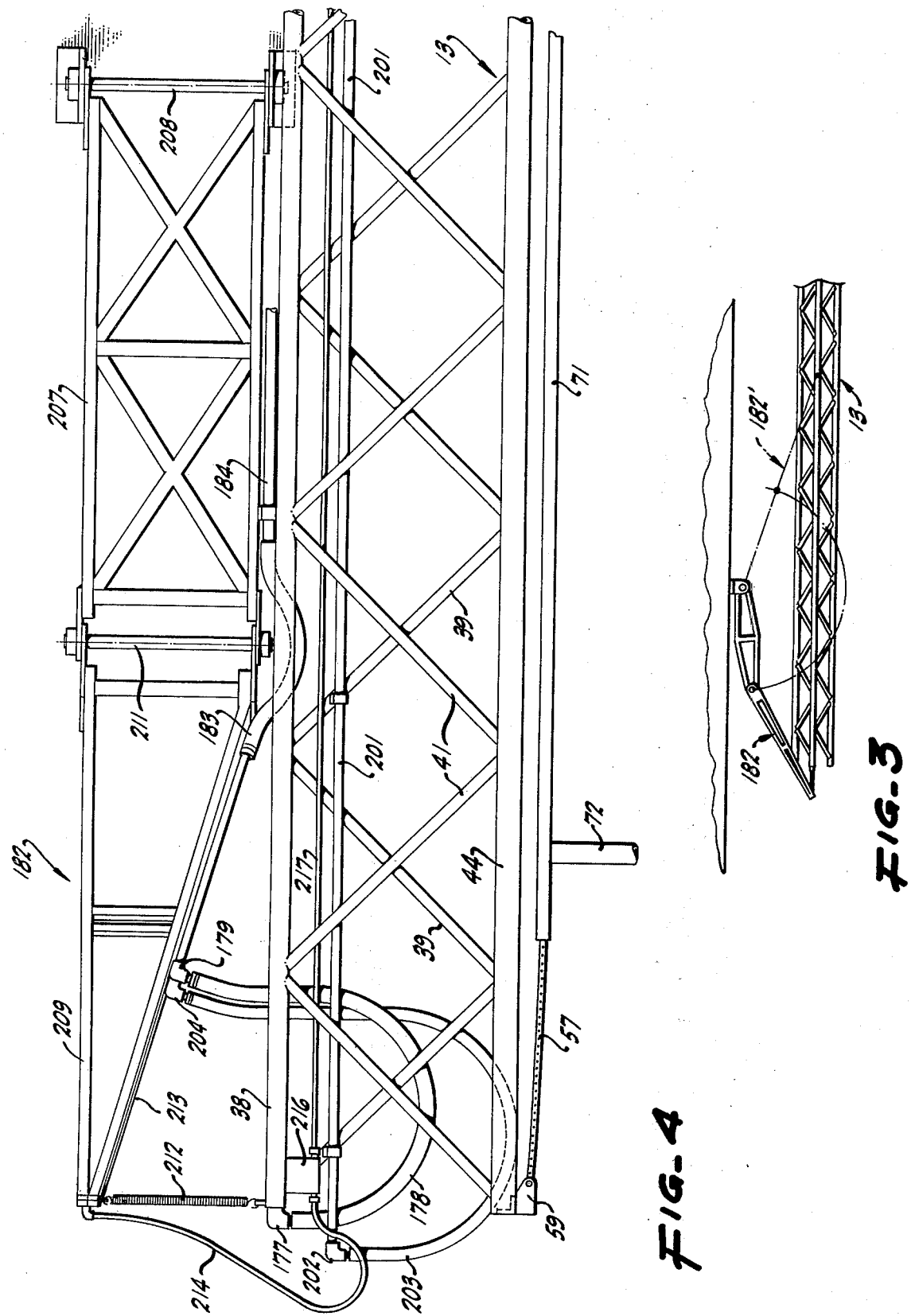

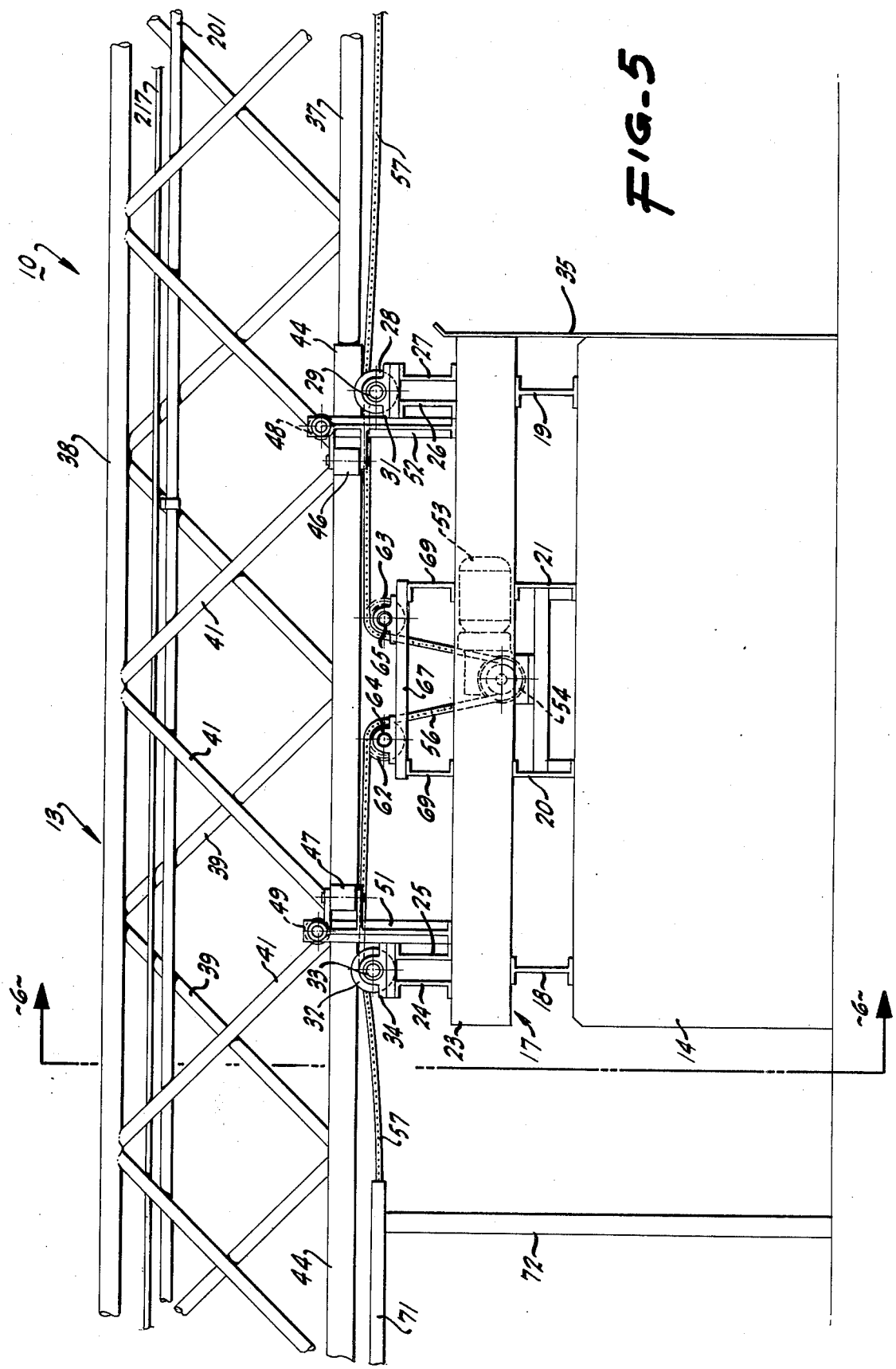

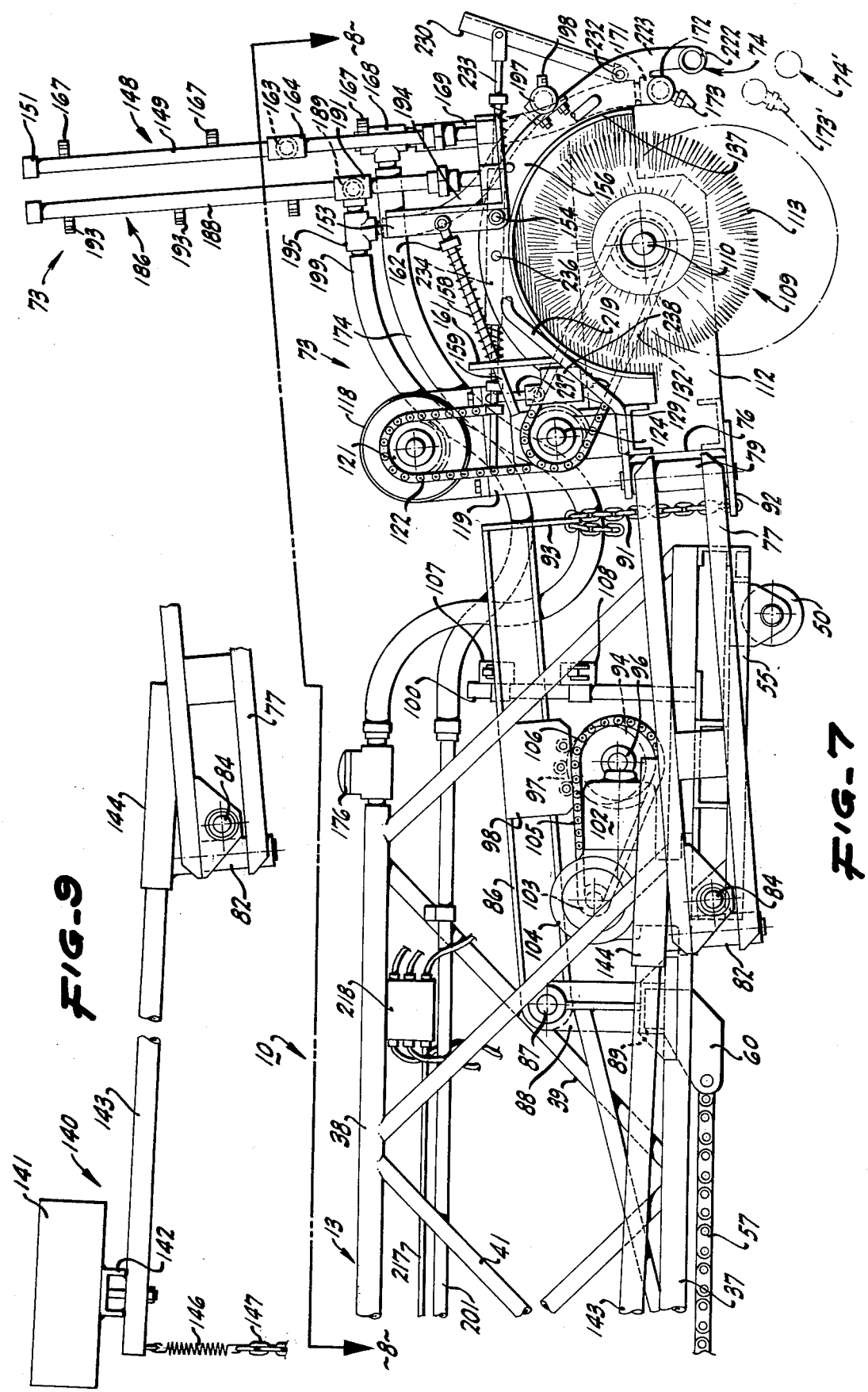

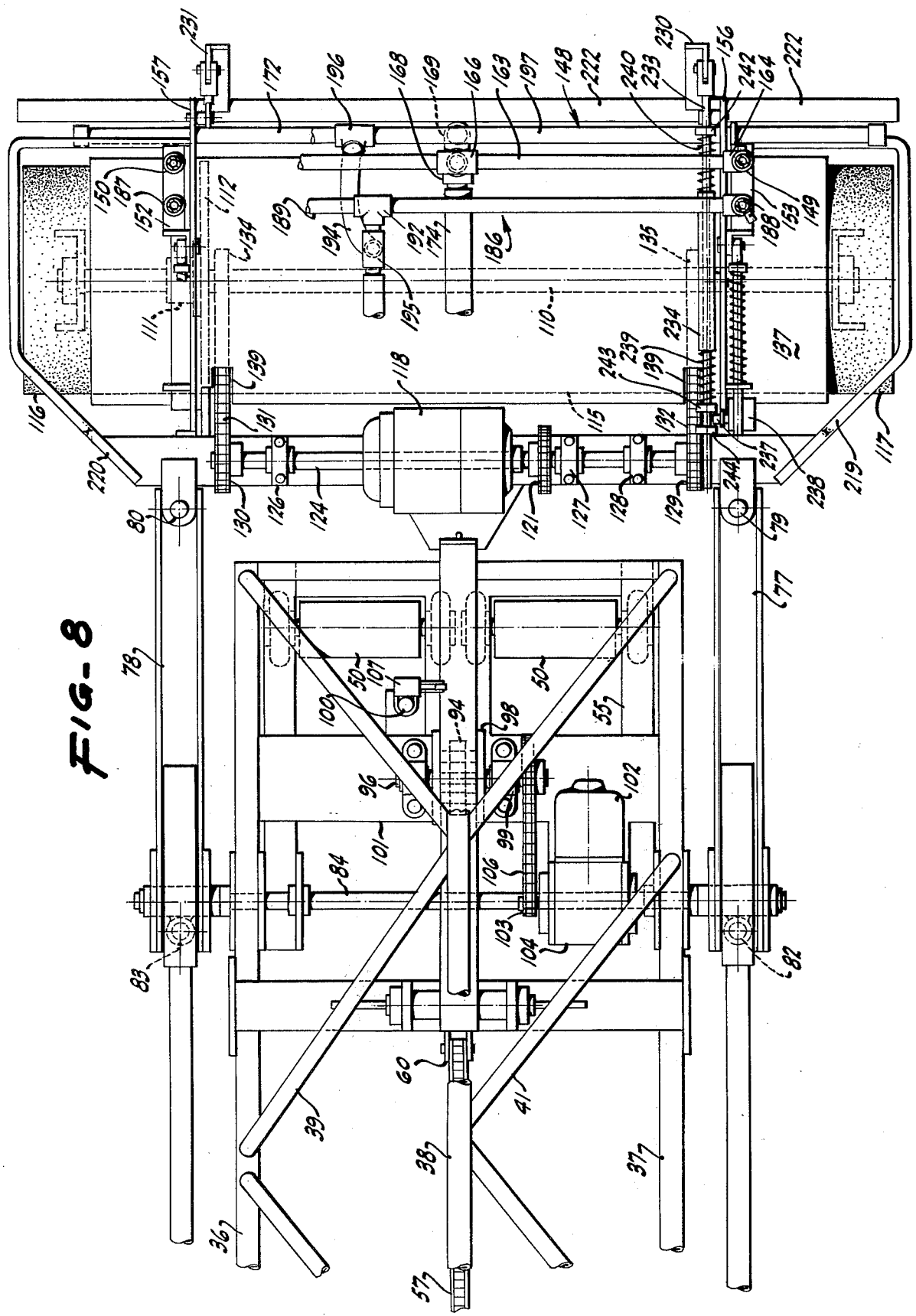

APPARATUS AND METHOD FOR WASHING INTERIORS OF TRUCK AND TRAILER BODIES

BACKGROUND OF THE INVENTION

This invention relates in general to the washing of truck or trailer body interiors, and in particular relates to apparatus and method for washing such interiors through an automatic washing cycle.

Various devices and systems have previously been employed for washing the interiors of truck or trailer bodies. Washing systems have been provided in which nozzles are mounted on small, wheeled vehicles which can roll into and out of the trailer. Such arrangements are relatively complicated and expensive to build and maintain, and furthermore are not fully automatic in operation such that the cycle time for washing a trailer is relatively long. Another washing system is of the type described in U.S. Pat. No. 3,689,318, issued Sept. 5, 1972, assigned to the same assignee as the present invention. The washing system which is disclosed therein employs a series of nozzles carried on the end of a boom which is fixed in position as a trailer being washed is backed and then driven forward so that the nozzles respectively enter and emerge from the trailer. In such a system the operator or driver controls the speed of the trailer as it is moved in relation to the nozzles so that the proper washing action is achieved.

OBJECTS AND SUMMARY OF THE INVENTION

It is a general object of the invention to provide a new and improved system and method for washing the interior of a truck or trailer body with greater effectiveness and speed through a high degree of automation.

Another object is to provide a washer system of the type described in which a traveling boom is mounted for movement into and from the trailer interior, with the boom carrying a washer head assembly which is adapted to automatically spray and brush the interior during the washing cycle.

Another object is to provide a washer system of the type described in which the washing cycle is automatic in operation such that the operator need only back the trailer to a position at which the control system is activated when the washer head makes initial entry into the trailer, with the washing cycle preceeding automatically to a point at which the operator drives the trailer forward for completion of the washing cycle.

The washer system and method of the invention includes an elongate boom which is mounted on a pedestal for movement along a horizontal axis into and out of the interior of a truck or trailer body. A washer head assembly is pivotally mounted on one end of the boom and carries a series of spray nozzles and a rotatable brush. The boom is traversed by means of a motor mounted on the pedestal, with the motor engaging a chain which has its opposite ends secured to opposite ends of the boom. A detergent mixture and rinse water are directed to the spray nozzles through flexible hosing and conduits which extend along the boom. A floating linkage is provided at the proximal end of the boom for carrying flexible hosing for the detergent and rinse water. The washer head assembly includes a frame which is mounted for vertical pivotal movement on the boom between the elevated and lowered positions, and the frame is supported by a four-bar linkage which moves transversely to accommodate any misalignment as the washer head enters the trailer. A hoist arm is pivotally mounted at one end to the distal end of the boom, with the other end of the hoist arm being connected with the washer head. A cam is eccentrically mounted on the boom and is in engagement with the hoist arm for raising and lowering the washer head as the cam is actuated.

A washing cycle is initiated when a photocell switch is activated as the operator backs the trailer to a position at which the washer makes initial entry into the trailer interior, thereby initiating the flow of detergent mixture to one set of the nozzles. Arrival of the trailer at its rearward limit of travel activates another photocell switch which initiates forward travel of the boom while an indicator light switches to red. When the washer head reaches its forward limit of travel within the trailer interior a limit switch is activated to stop both boom travel and the flow of detergent. After a time delay the control system lowers the washer head to engage the brush with the interior floor, the brush is rotated, rinse water is sprayed and the boom is moved rearwardly. Rearward movement of the boom is stopped when the boom reaches its limit of return travel, and an indicator light then turns green telling the operator to drive the trailer forward past a point at which the brush motor is caused to stop, rinse water spray ceases, and the washer head is raised to complete the washing cycle.

The foregoing and additional objects and features of the invention will become apparent from the following description in which the preferred embodiments have been set forth in detail in conjunction with the accompanying drawings.

BRIEF DESCRIPTION OF THE DRAWINGS

FIG. 1 is an elevational view of apparatus embodying the invention showing a typical semi-trailer unit in a position prior to initiation of a washing cycle;

FIG. 2 is a view similar to FIG. 1 illustrating the semi-trailer unit at its rearward limit of travel;

FIG. 3 is a fragmentary top plan view taken along the lines 3—3 of FIG. 1;

FIG. 4 is a fragmentary elevational view to an enlarged scale of the distal end of the boom illustrated in FIG. 1;

FIG. 5 is a fragmentary elevational view similar to FIG. 4 illustrating a mid-portion of the apparatus;

FIG. 7 is a fragmentary elevational view similar to FIG. 4 illustrating the distal end of the boom and the washer head;

FIG. 8 is a top plan view taken along line 8—8 of FIG. 7;

FIG. 9 is a fragmentary elevational view of the counterweight assembly for the washer head.

DESCRIPTION OF THE PREFERRED EMBODIMENTS

Figure 6:
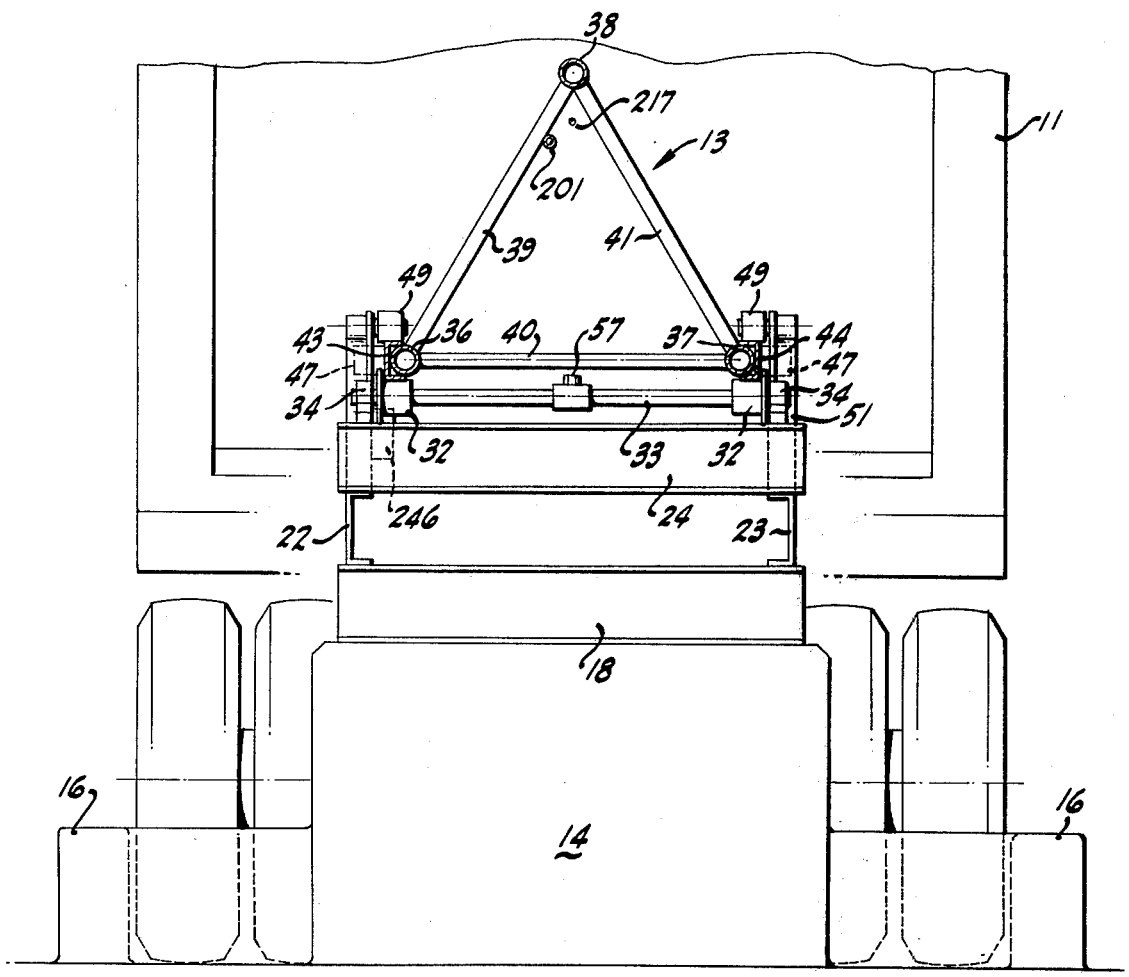
FIG. 6 is a cross-sectional view taken along the line 6—6 of FIG. 5.

In the drawings FIGS. 1 and 2 illustrate generally at 10 apparatus of the invention adapted for use in washing out the interior of a truck or trailer body such as the illustrated semi-trailer 11 of the type coupled through a fifth wheel to a tractor 12. While a semi-trailer is illustrated, the invention will also find application in washing out the interior of a truck body of the type which is integral with a tractor.

Apparatus 10 includes an elongate boom 13 mounted on a fixed base or pedestal 14 for movement along a horizontal axis over a wash stall 16 into which the trailer 11 is backed for washing. The boom is mounted on the pedestal at a sufficient elevation above the truck stall so as to clear the trailer floor as the boom enters the trailer.

Pedestal 14 preferably is of concrete and is adapted for supporting a lower framework 17, as shown in FIGS. 5 and 6. Framework 17 includes a pair of I-beams 18, 19 and a pair of channels 20, 21 which are secured to the pedestal. A pair of longitudinally extending channels 22, 23 are mounted across the I-beams, and front and rear pairs of oppositely facing channels 24–27 are mounted transversely across the longitudinal channels. A pair of spaced-apart flanged front support wheels 28 are mounted on an axle 29 which in turn is mounted on bearings 31 supported on channels 26 and 27. A similar part of spaced-apart flanged rear support wheels 32 are mounted on an axle 33 which in turn is mounted on bearings 34 supported above channels 24 and 25. A metal bumper plate 35 is secured to the front side of the pedestal such that the rear bumpers of a trailer will rest against the plate when the trailer is parked during a washing cycle.

Boom 13 comprises a frame formed of welded tube construction with a triangular configuration in cross-section, as best illustrated in FIG. 6. The edge longerons of the frame comprise piping 36, 37 and 38 supported by a lattice of pipe section cross bracing 39, 40 and 41. A pair of elongated inwardly facing channels 43, 44 are secured by suitable means such as welding to the outer sides of the lowermost piping 36, 37 and these channels are adpated to be rotatably supported on the flanged wheels 28, 34 to provide for lengthwise movement of the boom. The boom is constrained and guided on the wheels of the pedestal by means of front and rear pairs of vertically axised side rollers 46, 47 together with front and rear pairs of horizontally axised top rollers 48, 49. A set of the side and top rollers are mounted on respective ones of four upstanding brackets 51, 52 which are mounted at the four corners of pedestal frame 17. The side rollers rotatably engage the outer sides of the boom channels 43, 44, while the top rollers rotatably engage the top sides of these channels. The forward or distal end of the boom is supported for movement within the trailer by means of a pair of rollers 50 which are mounted below the boom on a frame 55 and are adapted to rotatably engage the trailer floor.

Boom 13 is actuated for back-and-forth movement along its longitudinal axis by means of a motor 53, preferably an electric motor, mounted within pedestal frame 17. The motor is operably connected with a drive sprocket 54 through a suitable gear train such as a worm drive. Sprocket 54 engages the downwardly extending mid-portion 56 of a chain 57 which extends the length of the boom. The rearward end of the chain is secured to the proximal end of the boom by a bracket 59, FIG. 4, and the chain's forward end is secured to the distal end of the boom by bracket 60, FIG. 7. A pair of idler sprockets 62, 63 are provided to direct the front and rear portions of the chain downwardly toward drive sprocket 54. The idler sprockets are rotatably mounted within bearings 64, 65 which in turn are mounted on a plate 67 secured to channels 68, 69 that extend across the pedestal frame. The portion of the drive chain which hangs suspended between the rear bracket 59 and axle 33 is supported by means of an elongate chain track 71 which is U-shaped in cross-section. The chain track is mounted below the path of travel of the boom by means of vertical posts 72.

A washer head 73 is mounted at the distal end of the boom. The washer head includes a frame 74 mounted for vertical pivotal movement relative to the boom between an elevated ready position, shown in solid line in FIG. 7, and a lowered operating position shown at 74'. The washer head frame includes a transverse beam 76 carried at the outer ends of a pair of support arms 77, 78 which extend along opposite sides of the boom. The forward ends of the support arms are mounted to beam 76 for pivotal movement about vertical axes by means of pivot connections 79, 80, and the rearward ends of the arms are similarly mounted for pivotal movement about vertical axes by means of pivot connections 82, 83. Each of the pivot connections 72 and 83 is in turn pivotally mounted on an axle 84 which is secured between the lower piping 36, 37 and frame 55 of the boom. The four vertical pivot connections between beam 76, the support arms 77, 78 and the boom create a four-bar linkage which permits the washer head to undergo a limited range of transverse movement for accommodating any misalignment of the boom and washer head as they enter the interior of a truck trailer.

Washer head 73 is pivoted vertically about axle 84 by means of a hoist arm 86. The hoist arm is mounted for movement about a horizontal axis through an axle 87 supported on a bracket 88 which extends upwardly from a channel 89 secured across the lower piping of the boom. The lower end of a support chain 91 is affixed to the washer head frame through a bracket 42, and a selected link of the chain is slipped through a slot formed in a bracket 93 which extends downwardly from the distal end of hoist arm 86. The angular position of washer head can thereby be adjusted relative to the hoist arm by shortening or lengthening the portion of the chain which is connected between brackets 92 and 93.

The mid-span of hoist arm 86 is supported and pivoted vertically by means of a cam 94 which is eccentrically mounted on an axle 96 below the hoist arm. The cam is in operating contact with a wear pad 97 secured by means such as bolts between a pair of brackets 98 which extend downwardly from opposite sides of the hoist arm. Cam axle 96 is rotatably mounted through a pair of bearings 99 which in turn are mounted on a plate 101 extending transversely across the lower piping of the boom. The cam is rotated for controlling the washer head position by means of a motor 102, preferably an electric motor, mounted on plate 101. Motor 102 engages with a drive sprocket 103 through suitable reduction gearing contained within housing 104. An endless chain 105 is trained around drive sprocket 103, as well as around a driven sprocket 106 which is keyed to the cam axle.

The control system of the invention includes upper and lower limit switches 107 and 108 which terminate operation of hoist motor 102 when cam 94 has turned through approximately 180° to either elevate or lower the washer head. The limit switches are mounted on a post 100 which is secured to the boom frame, with the switch 107 being mounted at the upper limit of travel of the hoist arm while switch 108 is at the lower limit of travel. To move the washer head to the elevated position, motor 102 is actuated by the control circuit to turn the cam upwardly to approximately the 12 o'clock position, at which point the hoist arm activates switch 107 which turns off the hoist motor. For lowering the washer head, hoist motor is operated to turn downwardly to the 6 o'clock position, at which point the hoist arm activates switch 108 which turns off the hoist motor.

A brush assembly 109 is provided for scrubbing the floor of the trailer interior to more effectively remove debris, dirt and other adhering material. The brush assembly includes an axle 110 rotatably mounted by means of a pair of bearings 111 on two laterally spaced upstanding support plates 112 which are mounted on and extend forwardly from transverse beam 78 of the washer head. A large plurality of radially outwardly extending brush elements 113 comprising stiff bristles are secured about the axle in three sections. The mid-sections 115 of the brush extends between the two support plates 112 while the left and right end sections 116, 117 extend outwardly from the respective left and right hand support plates, as illustrated in FIG. 8.

The axle and brush elements are driven by a motor 118, preferably an electric motor, mounted on a support frame 119 extending above transverse beam 76 of the washer head. Drive sprocket 121 of the brush motor engages an endless chain 122 which extends downwardly and is trained around a driven sprocket keyed for rotation with a drive transfer shaft 124. Shaft 124 is mounted by means of bearings 126, 127 and 128 above beam 76, and a pair of sprockets 129, 130 are keyed for rotation at opposite ends of the transfer shaft. These drive sprockets in turn engage a pair of drive chains 132, 133 which project forwardly through the spaces between brush mid-section 115 and thet two end sections 116, 117. The drive chains are trained around respective sprockets 134, 135 which are keyed for rotation on axle 110. An arcuate shroud 136 of sheet metal construction is mounted across brush supports 112 and extends across an arc of approximately 180° above the brush. Slots 138, 139 are formed in the shroud for entry of the drive chains and brush supports. The shrouds act as shields preventing detergent and water from being thrown backwardly by the rotating brush. Preferably brush motor 118 is driven in a direction to rotate the brush in a clockwise direction, as viewed in FIG. 7, so that the lowermost bristles of the brush which are in contact with the interior floor tend to move debris rearwardly for discharge through the rear of the trailer. Moreover, the fifth wheel of the tractor 12 which is employed for maneuvering the trailer is raised to a sufficient elevation so that the floor of the trailer inclines downwardly in a rearward direction to facilitate drainage of detergent, water and debris from the trailer during a washing cycle.

The washer head and the equipment and components which it carries are positioned in relation to pivot axle 84 so that gravity urges the washer head in a clockwise direction, as viewed in FIG. 7. When cam 94 is turned downwardly the weight of the washer head creates the contact force between the brush elements and the interior floor. This contact force is adjusted and maintained at the desired magnitude by means of a counterbalance assembly 140 which includes a pair of laterally spaced weights 141. The weights preferably are formed of sections of railroad rails mounted on a cross brace 142 which in turn is carried at its opposite ends by means of a pair of laterally spaced arms 143 which extend rearwardly from and are secured to brackets 144 welded to respective support arms 77, 78 of the washer head. The combined weight of the counterbalance assembly balances a portion of the weight of the washer head which lies forward of pivot axle 84. A pair of coil springs 146 depend from opposite sides of cross brace 142, and the lower ends of the springs are secured to chain sections 147 which in turn are fastened to the lower piping 36 and 37 of the boom. The lengths of the chain sections which are connected between the springs and piping are selectively varied to adjust the spring tension which acts as an additional force counterbalancing the weight of the washer head for purposes of obtaining a fine adjustment of the brush contact force.

Spray means is provided on the washer head for directing separate sprays of a detergent mixture and rinse water against the interior walls and floor of the trailer. The spray means includes a rinse water spray assembly 148 comprising a pair of vertical header pipes 149, 150 which are mounted on and extend upwardly from respective L-shaped brackets 152, 153. These brackets are pivotally mounted at pivot connections 154 on the flanges of a pair of arcuate ribs 156, 157 which are secured by means such as welding above the shroud 137. Each of the brackets 152, 153 is yieldably positioned in an upright orientation by means of a spring 158 which is mounted about a guide rod 159. The guide rod is pivotally connected at its front end to the bracket, and slidably projects through an opening formed in a plate 161 which is mounted on the washer head. Opposite ends of spring 156 abut the plate 158 and a retainer 162 on the guide rod.

A horizontal distributor pipe 163 extends laterally between the mid-portions of the vertical headers and is connected thereto by means of Tee fittings 164. An inlet Tee fitting 166 is connected in the mid-span of distributor pipe 163. A plurality of nozzles 167 are mounted at vertically spaced positions and in forward orientation along each vertical header pipe 149 and the top of each vertical header is enclosed by means of end caps 151.

The lower opening of inlet Tee 166 is connected through a pipe with a Tee 168, and the lower outlet of this Tee is in turn connected with a flexible hose 169. This hose extends downwardly and connects with the inlet of a Tee 171 which distributes the rinse fluid into a horizontal header pipe 172 mounted at its opposite ends on the downwardly extending ends of arcuate ribs 156 and 157. A plurality of spray nozzles 173 are mounted at spaced-apart positions and in a downwardly directed orientation along the length of the header pipe 172. The inlet opening of Tee 168 is connected with a flexible hose 174, the inlet end of which is in turn connected with a suitable anti-siphon valve 176. Valve 176 is in turn connected with the uppermost piping 38 of the boom frame to serve as the rinse water supply conduit. The anti-siphon valve 176 functions to close off flow through piping 38 when the rinse water circuit is depressurized so that the water in the piping will not drain through the hose 174 and spray headers.

As shown in FIG. 4 the inlet end of piping 38 is connected through Elbow fitting 177 with a flexible hose 178 which extends through a loop to an Elbow fitting 179 connected with a length of pipe 181 carried on a floating linkage 182. A flexible hose 183 connects pipe 181 with a pipe 184 on the floating linkage, and the pipe 184 is connected through a flexible hose, not shown, with a suitable source of rinse water under pressure, such as a pump, not shown, at the ground station.

The spray means on the header further includes a detergent spray assembly 186 for spraying a suitable detergent mixture against the trailer interior. Spray assembly 186 includes a pair of vertical headers 187, 188 mounted on and extending upwardly from the L-shaped brackets 152 and 153, respectively. A horizontal distributor pipe 189 is connected to midportions of headers 187, 188 through Tee fittings 191. An inlet Tee fitting 192 is connected at a mid-span of the pipe 189 to direct the detergent mixture into the headers.

A plurality of spray nozzles 193 are mounted at spaced positions along and in rearwardly and outwardly directed orientation from each of the vertical headers 187, 188. The inlet of Tee 192 is connected with one outlet of an additional Tee 195, the branch outlet of which is directed downwardly and is connected with a flexible hose 194. The lower end of hose 194 is connected with the inlet of a Tee 196 which is connected at the mid-span of a horizontal header pipe 197 mounted at its opposite ends above arcuate ribs 156, 157. A plurality of spaced nozzles 198 are mounted along header pipe 197 and are oriented at an angle for directing a spray of detergent water forwardly of the washer head. The inlet opening of Tee 195 is connected with the outlet end of a flexible hose 199, the inlet end of which is connected with piping 201 which is mounted to and extends along the lattice bracing 39, 41 of the boom frame.

As shown in FIG. 4 the inlet end of piping 201 is connected through an Elbow 202 with a flexible hose 203 which extends in a loop to an Elbow 204 which in turn is connected with a length of pipe 205 carried on floating linkage 182. The inlet end of pipe 205 is connected through suitable piping and flexible hose on the floating linkage with a supply of detergent mixture under pressure, such as a pump and detergent storage tank, not shown, at the ground station. Preferably the detergent mixture is heated for delivery to the pump and spray nozzles.

Floating linkage 182 provides moving support for the detergent and rinse water supply piping and hosing to permit the same to follow the boom as the washer head enters into and withdraws from the trailer. The floating linkage includes a swinging truss arm 207 pivotally mounted on a fixed foundation for movement about a vertical axis by means of axle 208, together with a follower arm 209 carried by the truss arm and adapted for pivotal movement about a vertical axis by means of an axle 211. The outboard end of follower arm 209 is interconnected by means of a coil spring 212 with thet rear end of the boom frame. As the boom moves back and forth along its longitudinal axis spring 212 acts to pull follower arm 209 along so that the floating linkage freely pivots between the position illustrated in solid line in FIG. 3, where the boom is at its rearward limit of travel, and the position indicated at 182', where the boom is at its forward limit of travel. The flexibility of the hose sections 178, 203 accommodates a range of displacement between the follower arm and the boom, while the flexibility of the hose sections 183 accommodates for the pivotal movement between the follower arm and truss arm.

Floating linkage 182 further supports an electrical conduit 213 which carries electrical power cables and control lines from the control system at the ground station to the boom and washer head. Conduit 213 includes a flexible section 214 which is carried at one end on the distal end of arm 209 and is connected at its opposite end with a junction box 216 mounted below piping 38 of the boom. The conduit 213 on the follower arm further includes flexible sections, not shown, leading across the truss arm to the ground station. The power cable and control leads from junction box 216 extend through a conduit 217 which is mounted to and extends along the length of the boom frame to a junction box 218 at the distal end of the boom. Suitable power cables and control leads extend from this junction box to the hoist motor 102, brush motor 118 and the various switches which are subsequently described.

A pair of guide rails 219, 220 are mounted on the washer head both for guiding the head into the trailer and for protecting the brush from damage. Each of the guide rails are curved around and over the outwardly projecting ends of the brush sections 116, 117. In addition, a horizontal guard rail 222 is mounted on brackets 223 below and in front of header 172.

The control system includes sensing devices and switch circuits for activating the various functions of the washer system. At a position immediately forward of the rear limit position of the washer head, as illustrated in FIG. 1, a first photocell switch 220 is mounted on a vertical post 221 positioned alongside the path of travel of trailer 11. A suitable source of light is either emitted or reflected from the opposite side of the path to direct a light beam toward this photocell. Rearward backing movement of the trailer interrupts the light beam to trigger photocell 220 for activating the washer control system and energizing the detergent pump. The control circuit includes a suitable hand operated switch, not shown, which selectively deactivates the detergent pump throughout the washing cycle so that only a cold water rinse is used to wash the trailer, as desired. Near the conclusion of the washing cycle forward movement of the trailer past the photocell 220 re-establishes the light beam for operating the control system to energize hoist motor 102 for raising the washer head, to stop brush motor 118, and to stop the rinse water pump.

A second photocell switch 222 is mounted on a vertical post 223 at a position immediately forward of pedestal 14 on a side of the path of trailer movement. A suitable light source is either emitted or reflected from the opposite side of the path to direct a light beam toward photocell 222. Movement of the rear of the trailer across this light beam as the trailer is backed into abutment with the pedestal operates the control system to energize boom motor 53 for driving the boom forward and carry the washer head into the trailer. An indicator light panel 224 is mounted on a vertical post 226 at a position adjacent the tractor cab, and the panel is provided with red and green indicator lights 227, 228 oriented for viewing by the tractor operator. Activation of photocell 222 further operates the control system to switch on red light 227 as an indication to the operator that the trailer is to remain parked for the first phase of the washing cycle.

An important feature of the invention is that truck or trailer bodies of varying lengths can be accommodated automatically by the washer system of the invention. Forward boom travel within such a truck or trailer is terminated by a sensing means which includes a pair of sensing arms 230, 231 each of which is pivotally mounted to the front side of the washer head about pivot connection 232 on a respective rib 156, 157. The sensing arms project at an angle forwardly and upwardly from the washer head so as to make initial contact with the front end wall of the trailer. A pair of actuating arms 233 are pivotally connected to the upper end of each sensing arm, and the arms 233 extend rearwardly through a respective one of the support tubes 234 which in turn are pivotally mounted at connection 236 to the ribs 156 and 157. The rearward ends of each arm 233 project from the tubes and extend in register with the operating arms 237 of double limit switches 238 which are mounted on opposite sides of the washer head.

Actuating arm 233 is spring bias to a centered position within tube 234 by means of a pair of compression springs 239, 240 mounted about the arm and in abutting relationship with opposite ends of the tube. The outer ends of the two springs abut against a pair of spaced retainer rings 242, 243 secured to the actuating arms. An additional retainer ring 244 is secured to the rear end of the actuating arm spaced from retainer ring 243, with these latter two rings being positioned on opposite sides of switch arm 237 such that longitudinal movement of the actuating arm causes the retainer rings to engage and operate the switch arm.

The limit switches 238 perform identical functions to provide operating redundancy and also to insure switch operation for terminating boom travel should one sensing arm 230 or 231 contact a portion of the trailer end or an obstruction within the trailer before contact is made by the other sensing arm. Actuation of either limit switch 238 deactivates boom travel motor 53, stops the detergent pump and activates a suitable time delay switch, not shown, in the control circuit. The time delay switch is set to operate after a predetermined time delay, e.g., a delay of 30 seconds, to permit the detergent to work within the trailer. The time delay switch thereafter operates to energize hoist motor 102 for lowering the washer head, to operate brush motor 118 for rotating the brush, to operate the rinse water pump, and to operate boom travel motor 53 in a reverse direction for moving the boom rearward.

A limit switch 246 is mounted on pedestal frame 14 below the path of travel of the lower left-hand piping 36 of the boom. An operating arm of switch 246 extends upwardly and is positioned in the path of movementt of a suitable projection or plate, not shown, which is secured to the boom frame at a position such that the plate makes contact with the arm of this limit switch when the boom reaches its rear limit of travel. The resulting movement of the operating arm actuates the limit switch to operate the control system for stopping boom motor 53 and terminate rearward travel of the boom. At the same time limit switch 246 turns on green panel light 228 for advising the operator to drive the tractor and trailer forward. As the rear of the trailer moves forward and clears the photocell 220 the light beam is re-established and the photocell switch is actuated for operating the control system to energize hoist motor 102 and raise the washer head, to stop brush motor 118, to stop the rinse water pump and to then deactivate the washer system.

Figure 10:
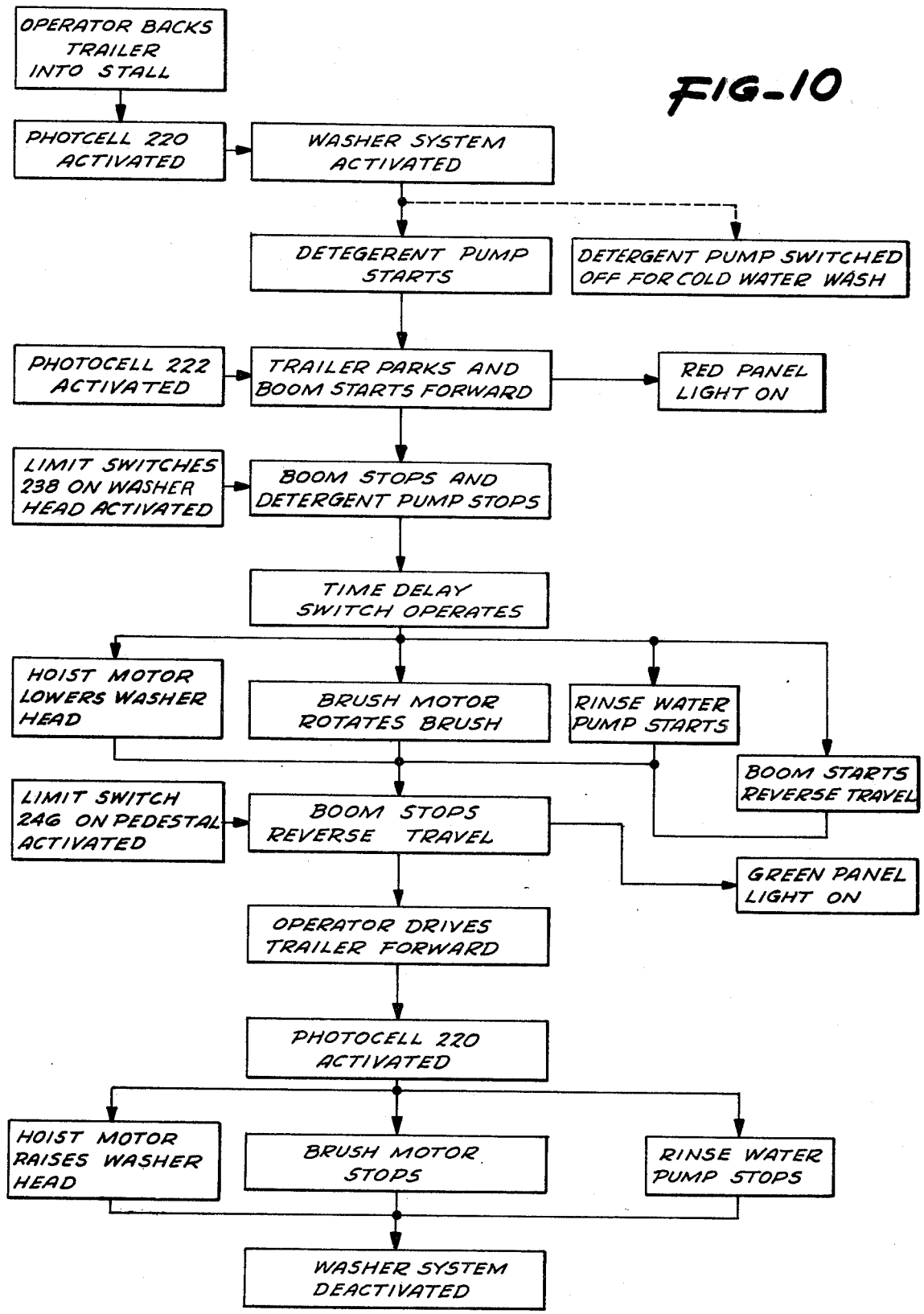
FIG. 10 is a flow chart illustrating the method of operation of the invention.

The operation of the washer system of the invention will be explained in conjunction with the flow chart of FIG. 10. The boom 13 is initially at rest at its rearward position illustrated in FIG. 1 with the washer head raised to the elevated position. The driver backs trailer 11 into wash stall 16 along a path aligned with the longitudinal axis of the boom. The rear edge of the trailer moves through and interrupts the light beam of photocell 220 which activates the washer system and starts the detergent pump. Detergent mixture is thereby pumped under pressure into piping 201, hose 199 and through the spray nozzles 193 and 198. As desired the detergent pump may be switched off so that only a cold water rinse is used during the washing cycle. The trailer continues to back until its rear edge interrupts the light beam of photocell 222 and thereafter abuts against pedestal 14 where the trailer is parked, as shown in FIG. 2.

Actuation of photocell 222 operates the control system to energize boom motor 53 for driving chain 57 in a direction which starts forward travel of the boom into the trailer interior. Simultaneously the control system switches on red indicator light 227 which advises the operator that the trailer should remain parked. The spray of detergent continues until the washer head reaches the front wall of the trailer, which is then contacted by sensing arms 230 and 231. The sensing arms are thereby pivoted rearwardly for actuating the two limit switches 238. Actuation of these limit switches operates the control circuit to stop both boom travel motors 53 and the detergent pump while at the same time triggering the time delay switch. Following a 30 second time period sufficient for the detergent mixture to loosen and dissolve dirt, grime and other such material within the trailer, the time delay switch operates the control system to energize hoist motor 102, to energize brush motor 118, to start the rinse water pump, and to energize boom motor 53 in a reverse direction.

Hoist motor 102 is energized until hoist arm 86 trips limit switch 108, at which point cam 94 has turned downwardly through 180° such that washer head 73 pivots downwardly by gravity, moving brush 109 into contact with the trailer floor, as illustrated at 109' in FIG. 2. Brush motor 118 operates to rotate the brush clockwise, as viewed in FIG. 7, and the rinse water pump directs water under pressure into piping 38 and hose 174 through spray nozzles 167 and 173. The rinsing and scrubbing continue as the boom is moved out of the trailer. When the boom reaches its rearward limit of travel limit switch 246 is actuated by contact with the boom frame, and this limit switch operates the control system to stop boom motor 53 and turn on green indicator light 228. Upon observing the green light the operator drives the trailer forward while the brushing and rinse action continue for scrubbing the rear portion of the interior. The washing cycle is terminated when the rear edge of the trailer moves forward sufficient to re-establish the light beam into photocell 220. This photocell thereby operates the control system to energize hoist motor 102, stop hoist motor 118 and stop the rinse water pump. The hoise motor is operated until the hoist arm turns upwardly sufficient to trip limit switch 107. Upward movement of the hoist arm pivots the washer head upwardly by means of the chain 91. The washer system is then deactivated with the boom and washer head in position for a repetition of the washing cycle with another trailer.

While the foregoing embodiments are at present considered to be preferred it is understood that numerous variations and modifications may be made therein by those skilled in the art and it is intended to cover in the appended claims all such variations and modifications as fall within the true spirit and scope of the invention.

We claim:

1. In a system for washing the interior of a truck or trailer body, the combination of a fixed base, an elongate horizontal boom mounted on the base, a washer head mounted on one end of the boom for entry into said interior, spray means on the washer head for directing washing fluid against said interior, brush-like scrubbing means on the washer head for contacting and scrubbing said interior, means for moving the washer head with said end of the boom along a horizontal axis into and out of the interior, and control means for actuating said spray means and scrubbing means when the washer head is within the interior.

2. A system as in claim 1 in which the spray means includes first and second conduits extending along said boom and adapted to direct, respectively, a detergent fluid and a rinse fluid to said washer head, detergent fluid distributor means mounted on said washer head and connected with said first conduit, rinse fluid distributor means mounted on said washer head and connected with said second conduit, a first flexible hose connected to direct a supply of detergent fluid under pressure to said first conduit, a second flexible hose connected to direct a supply of rinse fluid under pressure to said second conduit, and floating linkage means for supporting said first and second flexible hoses to permit the latter to travel with said washer head when the boom end travels along the horizontal axis for movement into and out of the trailer interior.

3. A system as in claim 1 in which said control means includes a first trailer-sensing switch for sensing the movement of the trailer to an initial entry position of the washer head into said interior for directing a flow of a detergent fluid through said spray means, a second trailer-sensing switch for sensing the rearward limit of movement of the trailer toward said boom mounting means for initiating said movement of the boom end into the trailer interior, limit switch means carried on the washer head for sensing the forward limit of movement of the boom into the interior for terminating boom movement and for terminating said flow of detergent fluid, said control means further including means for moving said boom out of the trailer while actuating said brush and directing a flow of rinse fluid through said spray means, and boom-sensing switch means for sensing the rearward limit of boom movement out of the trailer for terminating boom movement.

4. In a system for washing the interior of a truck or trailer body, the combination of a fixed base, an elongate horizontal boom, wheel means mounted on the base for rotatably supporting said boom for movement along a horizontal axis, actuator means for causing the boom to undergo relative movement into and out of the interior, a washer head mounted on one end of the boom for entry into said interior, spray means on the washer head for directing washing fluid against said interior, brush-like scrubbing means on the washer head for contacting and scrubbing said interior, actuator means including a drive motor for moving the boom relative to the base along the horizontal axis, and control means for actuating said spray means and scrubbing means when the washer head is within the interior.

5. A system as in claim 4 which includes a chain connected at its opposite ends to respective opposite ends of the boom, and said drive motor is mounted on said base and includes a drive sprocket in operating engagement with a portion of said chain which is adjacent said base.

6. In a system for washing the interior of a truck or trailer body, the combination of an elongate horizontal boom, means for causing the boom to undergo relative movement into and out of the interior, a washer head mounted on one end of the boom for entry into said interior, said washer head including a frame pivotally mounted at one end to said boom and extending outwardly therefrom along said axis, spray means carried on the frame of the washer head for directing washing fluid against said interior, brush-like scrubbing means carried on the frame of the washer head for scrubbing said interior, hoist means for pivoting said frame between an elevated position to permit entry of the washer head into the interior and a lower position to permit working engagement of said scrubbing means with said interior, and control means for actuating said spray means and scrubbing means when the washer head is within the interior.

7. A system as in claim 6 in which said hoist means includes a cam eccentrically mounted in operating relationship between said frame and said boom, and means for rotating said cam for moving the washer head between said elevated and lowered positions.

8. A system as in claim 6 in which said washer head frame includes a transverse beam mounted to carry said spray means and said brush means, a pair of transversely spaced side arms extending from their inboard ends adjacent the boom to their outboard ends adjacent the transverse beam, means for mounting the inboard ends of the side arms for pivotal movement about a transverse axis for raising and lowering the washer head, and means for mounting the inboard and outboard ends of the side arms on the respective boom and transverse beam for pivotal movement about respective vertical axes whereby the beam and side arms define with the boom a four-bar linkage which permits sideways movement of the washer head relative to the boom to accommodate misalignment of the washer head and boom as the latter enter the trailer interior.

9. A system as in claim 6 in which the hoist means includes a hoist arm pivotally mounted at its inboard end to said boom and having an outboard end extending over said frame, means interconnecting the outboard end of said hoist arm with said frame, a cam mounted on said boom for eccentric rotation about a transverse axis below said hoist arm and in operating engagement therewith, and actuating means for rotating said cam for vertically pivoting said hoist arm to thereby vertically pivot said frame for moving the washer head between said elevated and lowered positions.

10. A system as in claim 6 in which said frame is pivotally mounted at a position whereby gravity tends to pivot said frame in a direction urging said scrubbing means into said working engagement with the interior, and said hoist means is connected with said frame for urging the latter in opposite direction toward said elevated position.

11. In a system for washing the interior of a truck or trailer body, the combination of an elongate boom, a fixed base, means for mounting the boom on the base for movement along a horizontal axis, a washer head mounted on one end of the boom for entry into the interior, spray means on the washer head for directing washing fluid against said interior, brush-like scrubbing carried on the washer head, means for pivoting the scrubbing means into and out of engagement with said interior, means for actuating said scrubbing means when the latter is within the interior, and control means for moving said washer head and boom along said horizontal axis into and out of said interior and for activating said spray means.

12. A method for washing the interior of a truck or trailer body with an elongate horizontal boom having a washer head mounted at one end thereof, with the washer head including spray means and brush means, including the steps of backing the trailer toward said end of the boom when the washer head is in a raised position relative to the floor of the interior, directing a spray of detergent fluid through said spray means upon relative entry of the washer head into said interior, continuing to back the trailer to a rearward limit position relative to the boom, moving the boom forward along a horizontal axis into the interior while continuing the flow of detergent mixture through the spray means, terminating forward movement of the boom when the boom reaches a forward limit of travel within the interior, terminating the flow of detergent fluid, lowering the washer head until the brush means contacts the floor of the interior, directing a flow of rinse fluid through said spray means against the interior, rotating the brush means, moving the boom rearwardly out of the interior while continuing to rotate the brush means and while directing the rinse fluid through the spray means, terminating rearward boom movement when the latter reaches a rearward limit of travel, moving the trailer in a direction away from the boom, and terminating rotation of the brush means and terminating the flow of rinse fluid upon relative emergence of the washer head assembly from the interior.

13. A method as in claim 12 in which the steps of directing the flow of rinse water, rotating the brush and moving the boom rearwardly are delayed for a predetermined period of time following termination of the flow of detergent fluid.

* * * * *